United States Statutory Invention Registration [19]

[11] Reg. Number: H493

Tegiacchi et al.

[43] Published: Jul. 5, 1988

[54] ALKYLSULFONATED POLYSACCHARIDES AND MORTAR AND CONCRETE MIXES CONTAINING THEM

[75] Inventors: Fabio Tegiacchi; Benito Casu, both of Milan, Italy

[73] Assignee: Grace Italiana S.p.A., Milan, Italy

[21] Appl. No.: 575,733

[22] Filed: Feb. 1, 1984

[30] Foreign Application Priority Data

Mar. 3, 1983 [IT] Italy ..... 19879 A/83

[51] Int. Cl.[4] ..... C04B 24/16; C04B 24/10; C04B 24/38

[52] U.S. Cl. ..... 106/93; 106/92; 106/114; 106/115; 106/314

[58] Field of Search ..... 106/93, 115, 314, 90, 106/92; 524/2, 3

[56] References Cited

U.S. PATENT DOCUMENTS

| | | | |
|---|---|---|---|
| 2,429,211 | 10/1947 | Andes et al. | 106/92 |
| 2,562,148 | 7/1951 | Lea et al. | 106/92 |
| 2,583,657 | 1/1952 | Lea et al. | 106/93 |
| 2,795,508 | 6/1957 | Kaveler | 106/93 |
| 2,820,788 | 1/1958 | Filbert et al. | 106/93 |
| 2,891,057 | 6/1959 | Porath | 106/314 |
| 2,896,715 | 1/1959 | Jones | 106/92 |
| 3,530,112 | 9/1970 | Steinberg et al. | 106/92 |
| 4,073,658 | 2/1978 | Ohtani et al. | 106/92 |

FOREIGN PATENT DOCUMENTS

| | | | |
|---|---|---|---|
| 79683 | 2/1971 | German Democratic Rep. | 106/92 |

OTHER PUBLICATIONS

Hackh's Chem. Dictionary, pp. 317 and 725.

Kirk-Othmer—Encyclopedia of Chemical Technology—Third Edition vol. 5—pp. 70-88.

*Primary Examiner*—John F. Terapane

*Assistant Examiner*—J. E. Thomas

*Attorney, Agent, or Firm*—Bart G. Newland; William L. Baker

[57] ABSTRACT

Alkylsulfonated polysaccharides, methods of making them and use of said polysaccharides for improving the flowability of mortar and concrete mixes are disclosed.

20 Claims, 1 Drawing Sheet

Figure 1:
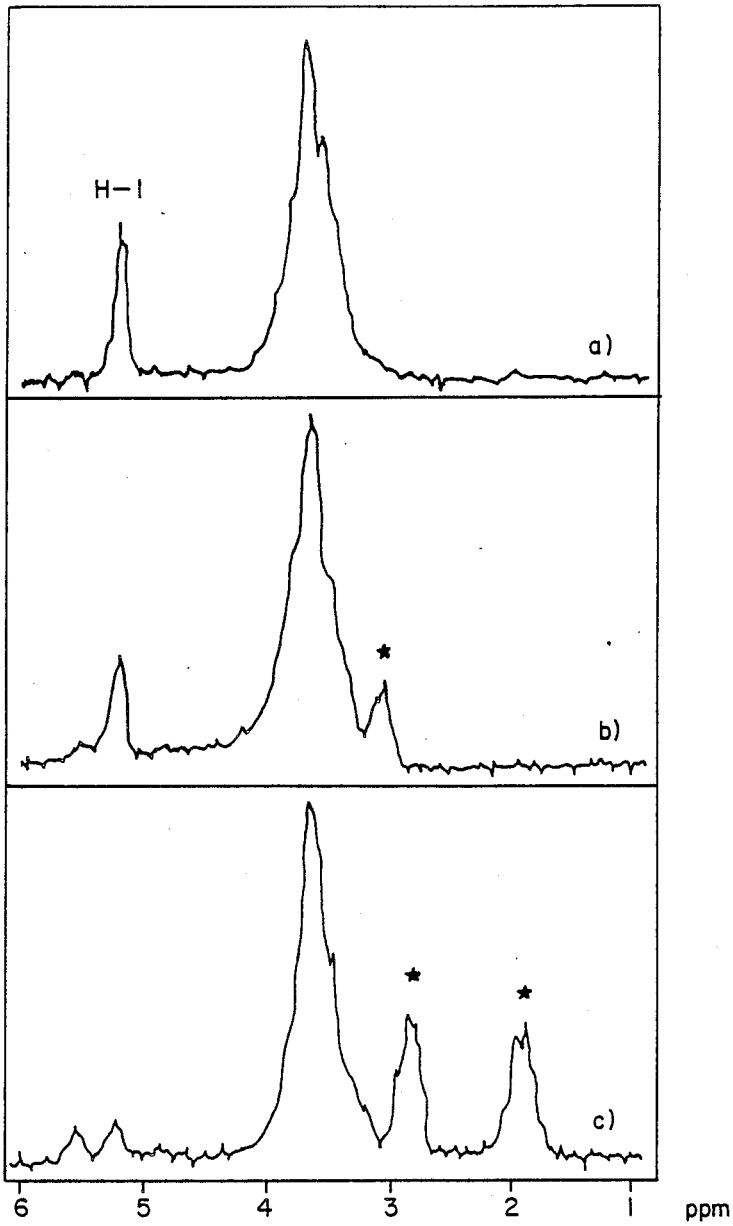

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ALKYLSULFONATED POLYSACCHARIDES AND MORTAR AND CONCRETE MIXES CONTAINING THEM

The instant invention concerns improvements in mortar and concrete mixes.

Particularly, the improvement of the instant invention consists of admixing mortar or concrete with a small amount of a fluidizing agent, viz. alkylsulfonated polysaccharides.

More particularly, the instant invention consists in improving the workability of mortar and concrete mixes so as to allow very low water/cement ratios. Mortar and concrete mixes are those mixtures of cementitous material and aggregates defined in ASTM specifications C270 and C125 respectively.

It is known in the art that in mortar and concrete mixes the initial weight ratio of water to cement, more commonly referred to as W/C ratio, is an important factor governing the so-called workability of the cement mix.

The amount of water required for a convenient workability is much greater than that which would be necessary for the full hydration of the hydraulic binder employed for making the mix.

The water excess, particularly in the case of high workability, may cause serious handicaps both to the fresh mix (excessive bleeding, segregation, etc.) as well as to the hardened mix (excessive shrinkage, high porosity, lower resistance, etc.).

In order to obtain a good workability of mortar and concrete mixes with lower W/C ratios, particular materials have long been proposed, and a number of them have reached commercial importance.

Usually, such materials are designated as fluidizing agents. More particularly, according to the Italian Standards for Testing Materials (UNI), these materials are grouped into two classes, i.e. fluidizing agents and superfluidizing agents. If the agent allows, in standard plastic mortars, a water reduction of not less than 6% (i.e.

$$100\frac{V_R - V_A}{V_R} \geqq 6\%$$

wherein $V_R$ is the water volume of the reference mix and $V_A$ is the water volume, inclusive of the fluidizing agent, of the fluidizing-agent-containing mix), then according to UNI Standard 7102-72 the material is defined as a fluidizing agent. If, on the other hand, said material allows a water reduction of not less than 10%, (i.e.

$$100\frac{V_R - V_A}{V_R} \geqq 10\%$$

wherein $V_R$ is the water volume of the reference mix and $V_A$ is the water volume, inclusive of the fluidizing agent, of the fluidizing-agent-containing-mix), then according to UNI Standard 8145 the material is defined as a superfluidizing agent. Fluidizing and superfluidizing agents as above defined meet requirements for type A and type F concrete mixes specified in ASTM C 494-80.

Known useful fluidizing agents are lignine-sulfonates, gluconates and tannates.

Some known industrial carbohydrates such as, e.g. glucose syrups (v. U.S. Pat. No. 3,432,317) and modified starch hydrolizates (v. Applicant's IT patent application No. 21080 A/80 filed on Apr. 28, 1980) are commonly used in cement mixes both for improving the rheologic properties of the mixes as well as for improving their mechanical strength. Their water reducing capability, though, is very limited and much inferior to that of the superfluidizers.

Industrially, the use of superfluidizers has acquired importance only during the past five years or so.

Known superfluidizers are made of polynaphthalene sulfonates (v. e.g. U.S. Pat. No. 2,141,569; DE-AS No. 1,238,831; CA Pat. No. 993,901) and of sulfonated melamine resins (v.e.g. IT Pat. No. 801,078).

It has now been found that by sulfonating polysaccharides with suitable sulfonating agents excellent superfluidizing agents having superior properties with respect to all the known fluidizing and superfluidizing agents can be obtained.

The alkyl sulfonated polysaccharide superfluidizing agents of the invention are characterized by a degree of polymerization (D.P.) of up to 100, a degree of sulfonation (D.S.) as hereinafter defined and determined, of from 0.2 to 3.0. They can be further characterized by their fluidizing activity, in as much as the addition of 0.4% of the inventive fluidizer is capable of imparting to the mortar to which it is added a flow increase of from 6.5% to 130% whenever the D.S. value is in the range of from 0.20, inclusive, to 1.50, inclusive.

Illustrative examples of useful polysaccharides for making the inventive superfluidizers are e.g. cellulose, hemicellulose, starches and hydrolizates thereof.

Illustrative examples of sulfonating agents for making the inventive superfluidizers are, e.g. chloromethylsulfonic acid, chloroethane sulfonic acid, chloropropane sulfonic acid and 1,3 propane-sultone.

The preferred inventive superfluidizers are those made of hydrolized cellulose sulfonated with chloromethane or chloroethane sulfonic acid.

Superfluidizers made of wood molasses sulfonated with chloropropanesulfonic acid as well as hydrolized starches sulfonated with chloroethane or chloropropane sulfonic acid are even more preferred.

At present, the most preferred inventive superfluidizers are those obtained from water soluble starch hydrolizates having a polymerization degree equal or lower than 100 and chloroethanesulfonic acid, as the sulfonating agent.

It would appear that the fluidizing activity of the inventive agents is a function of the starting polysaccharides and of the sulfonating agents used. This statement is supported by the data shown in the following Table.

TABLE 1

| FLUIDIZER | FLOW TESTS DOSAGES (b) | FLOW (mm) referred to plain |
|---|---|---|
| (1) hemicellulose | 0.6 | +12 |
| sulfopropylate (a) | 1.5 | +24 |
| (2) Starch | 0.3 | +24 |
| sulfopropylate (a) | 0.5 | +35 |
| (3) Soluble starch | 0.3 | +24 |
| solfoethylate (a) | 0.5 | +50 |

(a) prepared as in Examples 1, 2 and 3 respectively.
(b) Dosages are expressed as percent (dry to dry) of the amount of cement in the mix.

As it can be taken from Table 1, the fluidizers made of water soluble starches with polymerization degree of up to 100 and chloroethane sulfonic acid yield the best results, never achieved before with any known fluidizers or superfluidizers. The flow tests of Table 1 have been made with plastic mortars according to the Italian Standard UNI 8020, using Pt 325 cement (which is commonly used in industry).

The sulfonate groups of the inventive fluidizing agents can either be in the free acid form or can be salified with a Group IA and IIA metal cation preferably sodium, potassium or calcium. Other useful cations can be chosen from ammonium or the organic amines.

When the cation is derived from an organic amine, the amine may be any suitable primary, secondary or tertiary amine, such as, e.g. amines containing an hydroxyl group. Primary, secondary and tertiary alkanolamines are preferred.

The inventive superfluidizers are readily prepared by per se known methods.

The following examples are illustrative of the inventive superfluidizers, the way of making them as well as the way of using them in mortar and concrete mixes.

EXAMPLE 1

Hemicellulose sulfopropylate 100 g of a hemicellulose slightly soluble in water at room temperature suspended in 300 ml water containing 75 g NaOH are added with 450 g of 1,3 propane-sultone and reacted 16 hrs. at 50° C. under stirring. Then reaction mixture is allowed to stand for 48 hrs. at ambient temperature. The pH is then adjusted to 4 with 2 N sodium hydroxide and the title product is precipitated with methyl alcohol.

The yield is 80% of the theory. The substitution degree is 0.9.

EXAMPLE 2

Starch sulfopropylate 80 g of starch not soluble in water at room temperature suspended in 250 ml water containing 60 g NaOH are added with 350 g of 1,3 propane-sultone and reacted 16 hrs. at 50° C. under stirring.

The reaction mixture is then allowed to stand for 48 hrs. at ambient temperature and the pH is adjusted to 4 with 2 N NaOH. Finally, the title product is separated from the reaction mixture by precipitation with a 2.5:1.5 methanol/acetone mixture; then said product is dissolved in water and dialyzed through a 3500 Dalton cellulose acetate membrane.

The yield is 45% of the theory. The substitution degree is 1.1.

EXAMPLE 3

Water soluble starch sulfoethylate.

100 g of starch, easily soluble in water at room temperature suspended in 1000 ml isopropyl alcohol are added with 175 g of the sodium salt of 2-chloroethanesulfonic acid and a solution of 95 g of NaOH in 100 ml water is reacted, under stirring, for 15 min. at 30° C. and then further 60 min. at 80° C. The reaction is interrupted by cooling at room temperature.

After neutralizing with acetic acid, the water phase is dialyzed through a 3500 Dalton cellulose acetate membrane.

The yield is 80% of the theory. The substitution degree is 0.6.

As already said above, the fluidizing activity of the inventive agents appears to be a function of the starting polysaccharides and of the sulfonating agent used.

It further appears that such activity also depends on the sulfonation degree, i.e. the mean number of alkyl sulfonic groups per repeating unit of the polysaccharide chain.

It has been found that 0.2 is the minimum degree of sulfonation necessary for improving the fluidizing activity of the used polysaccharide, according to the instant invention.

It has further been ascertained that in order to obtain a fluidizing agent with outstanding activity (i.e. an activity greater than what is considered normal in the art) the degree of sulfonation must exceed 1.

The sulfonation degree (also referred to herein as D.S.) of the tested inventive sulfoalkyl polysaccharides has been determined by means of the nuclear magnetic resonance spectroscopy ($^1H$ - NMR).

The NMR spectra shown in FIG. 1 correspond to a typical water soluble starch (a) and to its sulfoethyl derivative (b) (D.S.≃0.5) as well as to its sulfopropyl derivative (c) (D.S. ≃1.1). The asterisks identify signals corresponding to the —$CH_2$—groups of the sulfoethyl and sulfopropyl substituents. These signals permit one to determine the sulfonation degree by relating their area to that of the anomeric signals (H-1).

The following Table 2 shows the dependence of the fluidizing activity on the degree of sulfonation.

TABLE 2

EFFECT OF THE DEGREE OF SULFONATION

| D.S. | FLOW (mm) | INCREASE OVER THE PLAIN (mm) |
|---|---|---|
| plain | 72 | = |
| 0.00* | 70 | −2 |
| 0.20 | 77 | +5 |
| 0.80 | 89 | +17 |
| 1.10 | 139 | +67 |
| 1.35 | 151 | +79 |
| 1.50 | 165 | +93 |

*This corresponds to the starting material, i.e. the unsubstituted or non-sulfoalkylated water soluble starch.

The sulfonated derivatives in Table 2 have been prepared by subjecting a commercial water soluble starch having a polymerization degree of 80 by sulfonation with the sodium salt of chloroethylsulfonic acid, according to the method described in Example 3.

The flow tests are performed with plastic mortars according to UNI Standard 8020 and using a Pt 325 cement; the amount of the fluidizer added being 0.4% of the weight of the cement.

The data in Table 2 shows that the addition of 0.4% of non-sulfoalkylated water soluble starch to mortar causes a slight decrease in the flowability of said mortar with respect to the plain (or non-additioned mortar).

The fluidizing effect becomes noticeable after addition of a 0.4 % amount of an inventive superfluidizer having a D.S. value of 0.20. The resulting effect, though, is of little interest from an industrial point of view.

A fluidizing effect in the range of those obtainable with known fluidizing agents is achieved by adding 0.4% of an inventive superfluidizer, having a D.S. value of 0.80.

With the addition of 0.4% of an inventive superfluidizer having a D.S. value of 1.10, the fluidizing effect attained is in the range of those obtainable with an equal amount of commercial superfluidizers.

Finally, the addition of 0.4% of an inventive superfluidizer, having a D.S. value of at least 1.35, the fluidizing effect attained is outstanding, i.e. much greater than the fluidizing effect achievable with an equal amount of any known superfluidizer.

The possibility of fluidizing the mortar and concrete mix depends not only on the sulfonation degree but also on the amount of fluidizing agent added thereto and is all the lower the higher is the sulfonation degree.

According to the present invention, interesting results (with respect to flowability) are obtained with dosages between 0.1% and 0.4% (of the weight of the hydraulic binder) and high D.S. values, i.e. greater than 1.0.

For achieving results of the same order of magnitude using fluidizers having a medium degree of sulfonation, i.e. with D.S. values in the range of from 0.8 to 1.2, the dosage of the fluidizer shall be in the range of from 0.2% to 0.6%.

When using fluidizers having a low degree of sulfonation, i.e. having D.S. values ranging from between 0.2 to 0.5, dosages greater than 0.6% are needed.

In particular, when using sulfoethylated water soluble starches (having a polymerization degree of ≦100), it has been found that with dosages of from 0.35% to 0.55% (of the weight of the hydraulic binder) and a D.S. value in the area of 0.8, the flowability of the mortar and concrete mix is of the same order of magnitude as that achievable using known fluidizers. When the D.S. value of said starches is in the area of 1, then the flowability of the mortar and concrete mix is equivalent to that of a mortar and concrete mix with a known superfluidizer. Finally, using a sulfoethylated starch of this invention having a D.S. value in the area of 1.3, the flowability of the mortar and concrete mix containing it is greater than that obtainable with any of the known superfluidizers.

The following Table 3 outlines the results attained with a commercial water soluble starch having a polymerization degree of ≦100, at increasing D.S. values, in comparison with fluidizers known in the art.

TABLE 3

COMPARISON OF THE INVENTIVE SUPERFLUIDIZERS WITH KNOWN FLUIDIZERS AND SUPERFLUIDIZERS OF THE COMMERCE

| | FLOW (mm) | | COMPRESSIVE STRENGTH ($Kg/cm^2$) at 7 days | |
|---|---|---|---|---|
| FLUIDIZER | Absolute value | Referred to plain | Absolute value | Referred to plain |
| 1 Commercial water soluble starch sulfoethylate (of the invention) D.S. = 0.8 | 89 | +17 | 292 | +66 |
| 2 Raw calcium lignine sulfonate liquor | 85 | +13 | 260 | +34 |
| 3 sodium gluconate mother liquor | 90 | +18 | 253 | +27 |
| 4 Commercial water soluble starch sulfoethylate (of the invention) D.S. = 1.0 | 129 | +47 | 289 | +63 |
| 5 Sodium polynaphthalene sulfonate | 120 | +38 | 280 | +54 |
| 6 Sulfonated melamine resin | 115 | +33 | 295 | +69 |
| 7 Commercial water soluble starch sulfoethylate (of the invention) D.S. = 1.30 | 159 | +67 | 267 | +41 |

The following Table 4 outlines the superior reduction of water demand obtained with a commercial water soluble starch having a polymerization degree of ≦100 and a D.S. value of 1.25, in comparison with a commercial known superfluidizer (polynaphthalene sulfonate).

TABLE 4

| FLUIDIZER | ml of water | W/C | flow | Compressive strength at 7 days($kg/cm^2$) |
|---|---|---|---|---|
| Plain | 225 | 0.5 | 85 | 260 |
| Sulfoalkylated starch | 194 | 0.43 | 86 | 358 |
| Naphthalene sulfonate | 200 | 0.44 | 86 | 342 |

According to UNI Standard 8145, the water reduction, as hereinafter defined, obtained with the sulfoalkylated starch:

$$100 \cdot \frac{225\ 194}{225} = 14\%$$

is greater than the water reduction obtained with the known superfluidizer (polynaphthalene sulfonate):

$$100 \cdot \frac{225 - 200}{225} = 11\%.$$

Tests summarized in Table 3 and 4 are carried out with plastic mortar, according to UNI Standard 8020, using a Pt.325 commercial cement.

The quantity of fluidizer added to the mix is the same for all the samples, i.e. 0.40% (referred to the weight of hydraulic binder).

The following Table 5 shows data obtained with concrete tests carried out according to Italian Standards (UNI 7163), using Pt425 cement of the commerce.

TABLE 5

| Cement type | Cement dosage kg/m³ | W/C | slump value (cm) | Compressive strengths (kg/cm²) 3 days | 7 days | 28 days |
|---|---|---|---|---|---|---|
| 425 Portland | 350 | 0.55 | 8 | 230 | 336 | 400 |
| idem + polynaphthalene sulfonate | 350 | 0.44 | 8 | 388 | 449 | 590 |
| idem + sulfoalkylstarch | 350 | 0.44 | 10 | 368 | 460 | 605 |

The inventive alkylsulfonated polysaccharides are useful for making mortar and concrete mixes containing any type of hydraulic binder such as Portland cement and blended cements (Portland blast-furnace slag cement, Portland-Pozzolan or fly ash cement, slag cement). The inventive mortar or concrete mix may contain other additives, such as hardening agents, air-entraining agents, plasticizers, accelerators and retarders known in the art.

It is expedient to note that the hydraulic binders used for making mortar and concrete mixes of the invention may already contain additives used in the clinker-grinding process and/or in the hydraulic binder manufacturing process.

The inventive superfluidizers can be incorporated into the mortar and concrete mix by any convenient method. Thus, they can be added directly to the mix, advantageously as a water solution.

Alternatively, the inventive fluidizers can be pre-mixed with one or more of the ingredients of the mix. If it is pre-mixed with cement, the fluidizer must necessarily be in the dry state.

The inventive fluidizers can also be added to the clinker during grinding. In this case, it can be mixed with known grinding aids such as, e.g. alkanolamines and glycols.

Although the instant invention is advantageously applicable to the production of any kind of mortar and concrete, this invention is particularly directed to the field of the additives which improve the workability of the concrete used in civil buildings or massive buildings (as bridges or roads), as well as for pre-cast concrete manufacturing.

What is claimed is:

1. A superfluidizing agent for mortar or concrete comprising an alkylsulfonated polysaccharide having a degree of polymerization of up to 100 and a degree of sulfonation of from 0.2 to 3.0, wherein said alkylsulfonated polysaccharide is an alkylsulfonated hemicellulose or wood molasses.

2. A superfluidizing agent of claim 1 wherein said degree of sulfonation is from 0.2 to 1.5.

3. A hydraulic cementitious composition comprising a hydraulic cement binder and an alkylsulfonated polysaccharide having a degree of polymerization of up to 100 and a degree of sulfonation of from 0.2 to 3.0, wherein said alkylsulfonated polysaccharide is an alkylsulfonated hemicellulose or wood molasses.

4. A composition of claim 3 wherein said alkylsulfonated polysaccharide is present in an amount of from 0.1% to 0.4% of the weight of said binder and said degree of sulfonation is greater than 1.0.

5. A composition of claim 3 wherein said alkylsulfonated polysaccharide is present in an amount of from 0.2% to 0.6% of the weight of said binder and said degree of sulfonation is from 0.8 to 1.2.

6. A composition of claim 3 wherein said alkylsulfonated polysaccharide is present in an amount greater than 0.6% by weight of said binder and said degree of sulfonation is from 0.2 to 0.5.

7. A method for increasing the flowability of a mortar or concrete mix containing a hydraulic cement binder which comprises the step of incorporating into said mix about 0.1% to about 1.0% by weight, based on the weight of said binder, of an alkylsulfonated polysaccharide superfluidizing agent having a degree of polymerization of up to 100 and a degree of sulfonation of from 0.2 to 3.0, wherein said alkylsulfonated polysaccharide is an alkylsulfonated hemicellulose or wood molasses.

8. A method of claim 7 wherein said degree of sulfonation is from 0.2 to 1.5.

9. A superfluidizing agent for mortar or concrete comprising alkylsulfonated starch having a degree of polymerization of less than 100 and a degree of sulfonation of from 0.2 to 3.0.

10. A superfluidizing agent of claim 9 wherein said degree of sulfonation is from 0.2 to 1.5.

11. A superfluidizing agent of claim 9 wherein said degree of polymerization is 80.

12. A superfluidizing agent of claim 9 wherein said alkylsulfonated starch is an alkylsulfonated water soluble starch.

13. A superfluidizing agent of claim 12 wherein said alkylsulfonated water soluble starch is prepared by a process comprising alkylsulfonation of water soluble starch with chloroethanesulfonic acid.

14. A superfluidizing agent of claim 12 wherein said degree of sulfonation is about 1.3 or greater.

15. A hydraulic cementitious composition comprising a hydraulic cement binder and alkylsulfonated starch having a degree of polymerization of less than 100 and a degree of sulfonation of 0.2 to 3.0.

16. A composition of claim 15 wherein said alkylsulfonated starch is an alkylsulfonated water soluble starch.

17. A compositon of claim 16 wherein said starch is present in an amount of from 0.35% to 0.55% of the weight of said hydraulic binder and said degree of sulfonation is from about 0.8 to 1.3.

18. A method for increasing the flowability of a mortar or concrete mix containing a hydraulic cement binder which comprises incorporating into said mix about 0.1% to about 1.0% by weight, based on the weight of said binder, of alkylsulfonated starch having a degree of polymerization of less than 100 and a degree of sulfonation of from 0.2 to 3.0.

19. A method of claim 18 wherein said alkylsulfonated starch is an alkylsulfonated water soluble starch which is incorporated into said mix in an amount of from 0.35% to 0.55% of the weight of said binder and has a degree of sulfonation of from about 0.8 to about 1.3.

20. A superfluidizing agent for mortar or concrete comprising alkylsulfonated water-soluble starch having a degree of sulfonation of from about 0.8 to about 1.3 and a degree of polymerization small enough whereby said agent acts as a superfluidizer.

* * * * *